United States Patent
Kunz et al.

(10) Patent No.: US 11,897,356 B2
(45) Date of Patent: Feb. 13, 2024

(54) CHARGING SYSTEM FOR ELECTRIC VEHICLES

(71) Applicant: Compleo Charging Solutions AG, Dortmund (DE)

(72) Inventors: Michael Kunz, Essen (DE); Holger Riemenschneider, Dortmund (DE); Srdan Skrbic, Dortmund (DE); Christian Lewandowski, Unna (DE)

(73) Assignee: Compleo Charging Solutions AG, Dortmund (DE)

( * ) Notice: Subject to any disclaimer, the term of this patent is extended or adjusted under 35 U.S.C. 154(b) by 426 days.

(21) Appl. No.: 17/345,131

(22) Filed: Jun. 11, 2021

(65) Prior Publication Data
US 2021/0300200 A1 Sep. 30, 2021

Related U.S. Application Data

(63) Continuation of application No. PCT/EP2019/083404, filed on Dec. 3, 2019.

(30) Foreign Application Priority Data

Dec. 11, 2018 (DE) ..................... 10 2018 131 770.0

(51) Int. Cl.
*B60L 53/66* (2019.01)
*B60L 53/67* (2019.01)
(Continued)

(52) U.S. Cl.
CPC ............... *B60L 53/66* (2019.02); *B60L 53/67* (2019.02); *B60L 53/68* (2019.02); *G06Q 10/02* (2013.01); *G06Q 50/06* (2013.01)

(58) Field of Classification Search
CPC .......... B60L 53/66; B60L 53/67; B60L 53/68; B60L 53/60; B60L 53/305; G06Q 10/02;
(Continued)

(56) References Cited

U.S. PATENT DOCUMENTS

| | | | | |
|---|---|---|---|---|
| 10,846,763 B2 * | 11/2020 | Khoo | ...................... | H04L 25/20 |
| 2009/0313033 A1 * | 12/2009 | Hafner | .................. | G07F 15/008 |
| | | | | 705/1.1 |

(Continued)

FOREIGN PATENT DOCUMENTS

| WO | WO 2013/023701 A1 | 2/2013 |
|---|---|---|
| WO | WO 2013/032519 A1 | 3/2013 |

OTHER PUBLICATIONS

M. Dujak, Z. Kljaić, M. Šerbec and H. Jelačić, "Next-Generation Utilities based on M2M Communications," 2014 37th International Convention on Information and Communication Technology, Electronics and Microelectronics (MIPRO), Opatija, Croatia, 2014, pp. 507-513, doi: 10.1109/MIPRO.2014.6859620. (Year: 2014).*

*Primary Examiner* — M Baye Diao
(74) *Attorney, Agent, or Firm* — Pauly, DeVries Smith & Deffner LLC

(57) ABSTRACT

Charging system for electric vehicles including a backend system and a charging station. The charging station includes a charging control module to control a charging process between a charging point of the charging station and an electric vehicle connectable to the charging point at least based on a configuration data set comprising a charging configuration parameter. The backend system includes a multiplex module connectable to a configuration memory module. The configuration memory module stores a plurality of time dependent configuration data sets. The multiplex module determines a time dependent configuration data set upon receipt of a configuration request message emitted by the charging station based on a time specification of the configuration request message. The multiplexing module is configured to cause a transmitting of the determined configuration data set to the charging station. The charging
(Continued)

control module configured to control the charging process based on the received configuration data set.

10 Claims, 3 Drawing Sheets

(51) Int. Cl.
*B60L 53/68* (2019.01)
*G06Q 10/02* (2012.01)
*G06Q 50/06* (2012.01)

(58) Field of Classification Search
CPC ........ G06Q 50/06; G06Q 50/30; Y02T 10/70; Y02T 10/7072; Y02T 90/12; Y02T 90/16
USPC .......................................... 320/137
See application file for complete search history.

(56) References Cited

U.S. PATENT DOCUMENTS

| | | | |
|---|---|---|---|
| 2010/0134067 A1 | 6/2010 | Baxter et al. | |
| 2011/0016063 A1 | 1/2011 | Pollack et al. | |
| 2013/0057210 A1* | 3/2013 | Nergaard | B60L 53/11 320/109 |
| 2013/0211988 A1* | 8/2013 | Dorn | B60L 53/65 700/297 |
| 2021/0261016 A1* | 8/2021 | Kledewski | B60L 53/62 |
| 2021/0268929 A1* | 9/2021 | Cater | B60L 53/62 |

* cited by examiner

CHARGING SYSTEM FOR ELECTRIC VEHICLES

CROSS-REFERENCE TO RELATED PATENT APPLICATIONS

This patent application is a continuation of International Application No. PCT/EP2019/083404, filed on Dec. 3, 2019, which claims the benefit of priority to German Patent Application No. 10 2018 131 770.0, filed Dec. 12, 2018, the entire teachings and disclosures of both applications are incorporated herein by reference thereto.

FIELD OF THE INVENTION

The application relates to a charging system for electric vehicles, wherein the charging system comprises at least one backend system and at least one charging station. In addition, the application relates to a method for operating a charging system.

BACKGROUND OF THE INVENTION

Electric charging stations for charging electric vehicles are known. A charging station typically comprises at least one charging point electrically coupled to an energy source, such as a power grid and/or a generator.

The charging point may comprise an electrical connection configured to connect the charging point to an electric vehicle via a charging cable. The charging process is controlled by a charging control module of the charging station, i.e., controlling an authentication process, controlling a possible subsequent release of a current flow, controlling the charging current flowing during the charging process, controlling the amount of energy transferred during the charging process, controlling the termination of the energy transfer and current flow, respectively, and/or controlling the subsequent billing.

For a particular control a known charging control module is fixedly configured. For example, a configuration data set with a plurality of configuration parameters is stored in the charging station. Based on this fixed configuration, the charging control module controls each charging process.

The disadvantage of this is the inflexibility of the charging station due to the fixed charging configuration. This leads to limited usability and applicability of the charging station.

BRIEF SUMMARY OF THE INVENTION

Therefore, the object of the application is to provide a charging system with at least one charging station, which has an increased flexibility.

The object is solved according to a first aspect of the application by a charging system for electric vehicles according to claim 1. The charging system comprises at least one backend system. The charging system comprises at least one charging station comprising at least one charging control module configured to control a charging process between at least one charging point of the charging station and an electric vehicle connectable to the charging point at least based on a configuration data set comprising at least one charging configuration parameter. The backend system comprises at least one multiplex module connectable to a configuration memory module, wherein a plurality of time dependent configuration data sets are stored in the configuration memory module. The multiplex module is configured to determine a time dependent configuration data set upon receipt of a configuration request message emitted by the charging station based on at least one time specification of the configuration request message. The multiplexing module is configured to cause a transmitting of the determined configuration data set to the charging station. The charging control module is configured to control the charging process based on the received configuration data set.

In contrast to the prior art, according to the application a charging system with a flexibly operable charging station is provided in that a time dependent configuration of the charging station and a control of the charging processes according to the respective configuration is carried out by the charging control module of the charging station.

In particular, the charging system comprises a backend system, for example, a backend system formed by one or more server(s), and at least one charging station in communication with the backend system. For example, the charging station may comprise a wired and/or wireless communication module configured to communicate with the backend system, in particular, in a bidirectional manner.

The charging station comprises at least one charging point, for example, in the form of an electrical connection connected to a power source. The connection can be connected and coupled, respectively, to a connection of an electric vehicle via a charging cable in order to exchange electrical energy with the electric vehicle and its energy storage, respectively.

As used herein, an electric vehicle means a vehicle that is at least partially electrically operable and comprises a rechargeable electrical storage device.

A charging control module is configured to control a charging process according to an updatable configuration data set and the charging configuration parameters defined in the configuration data set, respectively. Exemplary and non-exhaustive charging configuration parameters are permissible user groups, non-permissible user groups, maximum permissible charging current, maximum permissible amount of energy that may be transferred per charging process and/or per time unit, the electricity supplier to be used, the responsible charging station operator, the end customer price, and the like.

Depending on the respective time dependent parameter value of at least one of the previously mentioned charging configuration parameters, the charging process can be controlled by the charging control module of the charging station. In particular, the charging control module may perform at least one controlling action from the following group: controlling of an authentication process, for example, depending on the currently valid user group, controlling of a possibly subsequent release of a current flow, controlling of the charging current flowing during the charging process, for example, depending on the currently valid maximum charging current, controlling of the amount of energy transferred during the charging process, for example, depending on the currently valid amount of energy, controlling of the termination of the energy transfer and the current flow, respectively, and/or controlling of the subsequent billing, for example, depending on the currently valid end customer price and/or the currently valid charging station operator.

According to the application, it is provided that the configuration data set to be used by the charging control module is time dependent. In other words, the valid charging configuration parameters and values, respectively, of a charging station change depending on a current (instantaneous) time specification, such as the current (instantaneous)

time of day, the current (instantaneous) day of the week, the current (instantaneous) month, the current (instantaneous) season, and/or the like.

In order to operate the at least one charging station in such a flexible manner, the backend system comprises at least one multiplex module and at least one configuration memory module. In the configuration memory module a plurality of time dependent configuration data sets is stored indirectly and/or directly.

By directly it is to be understood that the respective charging configuration parameters are (actually) stored in the configuration memory module. By an indirect storing it is to be understood that for a charging configuration parameter (value) in the configuration memory module only a memory address of a further memory location is stored, in which the charging configuration parameter (value) is (actually) stored.

Upon receipt of a configuration request message from a charging station, the multiplex module checks a time specification of the configuration request message, i.e., a time specification associated with the configuration request message, and evaluates the time specification and the timing dependency of the stored charging configuration data sets. Based on the time specification, the multiplex module then determines the associated time dependent configuration data set stored in the configuration memory module from the plurality of stored configuration data sets.

After a configuration data set is determined, the multiplex module causes a transmitting of the determined configuration data set. For example, the multiplex module causes a communication module of the backend system to emit, in particular, transmit, at least one message containing the determined configuration data set to the requesting charging station.

Subsequently, the charging control module of the charging station controls the charging process with the electric vehicle according to the at least one charging configuration parameter of the received configuration data set, as previously described. For example, the received configuration data set may be temporarily stored in a memory module of the charging station that can be accessed by the charging control module. For example, the previous configuration data set may be deleted and/or disabled and marked as invalid, respectively.

According to a first embodiment of the charging system according to the application, the charging station may comprise a request module configured to cause an emitting of a configuration request message upon a detection of a trigger information. The trigger information may comprise a charging request received by the charging station from an electric vehicle to be charged.

For example, upon a detection of an electrical connection to an electric vehicle to be charged, for example, based on a charging request signal emitted by the electric vehicle, the request module may generate a configuration request message and, in particular, cause its emission by a communication module of the charging station. In particular, the charging station communication module transmits the at least one configuration request message to the backend system via a communication network (e.g., mobile radio network, etc.). Also, the charging request may be a user action detected at a user interface module of the charging station or a charging request message received from a user terminal.

It shall be understood that in other variants of the application, the trigger information may be an expiration of a specific time period (e.g., x min) and the charging station emits a configuration request message (automatically) upon an expiry of this time period.

According to a further embodiment of the charging system according to the application, the backend system may comprise a first time module configured to provide a current time specification, wherein as time specification of the configuration request message, the time of receipt of the configuration request message may be determined by means of the first time module. In other words, using the first time module, in particular, in the form of a first clock, the time of receipt of the configuration request message can be determined. Based on this time specification, the associated configuration data set can subsequently be determined, in the manner described above.

In particular, in order to at least make a manipulation of the operation of the charging system more difficult and/or to reduce erroneous configurations, according to a preferred embodiment of the charging system according to the application, the charging system may comprise at least one master device connectable at least to the backend system. For example, the master device may comprise a communication module to communicate with the backend system. The master device may be configured to (time) synchronize the first time module with a master time module of the master device. In other words, the master time module may cause an emitting of a synchronization message with time data to the backend system to cause a correcting, if necessary, of a discrepancy between the time specification (e.g., instantaneous time of day and/or instantaneous date and/or instantaneous day of week, etc.) instantaneously provided by the master time module and the time specification (e.g., instantaneous time of day and/or instantaneous date and/or instantaneous day of week, etc.) instantaneously provided by the first time module. If the backend system detects a deviation, a corresponding correction and thus a synchronization are performed. It shall be understood that run time effects can be taken into account here.

In particular, the master device can be configured to synchronize the first time module at predeterminable (regularly repeating) time points, such as at a specific time point within each hour, each day and/or each week, etc.

Furthermore, according to a further embodiment of the charging system according to the application, the charging station may comprise at least one second time module. The charging station may comprise a request module configured to integrate the current time specification provided by the second time module into a configuration request message as a time specification of the configuration request message. The request module may be configured, in particular, according to the previous description, to generate a configuration request message upon a detection of a trigger information. The generating comprises in the present case the adding of a time specification in the form of the time specification instantaneously provided by the second time module (e.g. instantaneous time of day and/or instantaneous date and/or instantaneous day of week etc.). This time specification may alternatively or additionally be taken into account by the multiplex module of the backend system in determining the configuration data set.

In particular, in order to at least make a manipulation of the operation of the charging system more difficult and/or to reduce erroneous configurations, according to a preferred embodiment of the charging system according to the application, the charging system may comprise at least one master device (described above) connectable at least to the charging station. For example, the master device may comprise a communication module to communicate with the charging station. The master device may be configured to (time) synchronize the second time module with a master time module of the master device. In other words, the master time module may cause an emitting of a synchronization message to the charging station to cause a correction, if necessary, of a discrepancy between the time specification (e.g., instantaneous time of day and/or instantaneous date and/or instantaneous day of week, etc.) instantaneously provided by the master time module and the time specification (e.g., instantaneous time of day and/or instantaneous date and/or instantaneous day of week, etc.) instantaneously provided by the second time module. If the charging station detects a deviation, a corresponding correction and thus a synchronization are performed. It shall be understood that run time effects can be taken into account here.

The master device can, in particular, be configured to synchronize the second time module at predeterminable (regularly repeating) time points, such as at a specific time point within each hour, each day and/or each week, etc.

According to a particularly preferred embodiment, the configuration memory module may be configured to store a configuration assignment table. In the configuration assignment table, each configuration data set may be assigned with a specific time range, in particular, a time of day range, so that time dependent configuration data sets may be provided.

The use of a configuration assignment table allows a determining of the configuration data set in a particularly efficient manner. In particular, the configuration data set to be instantaneously used by a charging station can be determined in almost real time and its emission be caused. In particular, a time delay of the start of the charging process is not noticeable to the user.

Preferably, the multiplex module may be configured to determine a configuration data set assigned with a particular time range by comparing the (previously described) time specification of the configuration request message with the time ranges provided in the configuration assignment (allocation) table, such that the configuration data set is determined which is assigned (associated) with the time range that corresponds to the time specification.

For example, a configuration assignment table may comprise different charging configuration parameters (values) stored for different time of day ranges. If a specific time of day is provided as a time specification of the configuration request message, there is a correspondence to a time of day range, in particular, if this time of day falls within a specific time of day range of the configuration assignment table. The configuration data set assigned with and corresponding to, respectively, this time range can then be determined as the configuration data set with the corresponding parameter values.

An exemplary configuration assignment table is shown in the following table 1.

Preferably, the parameter values can be stored only indirectly in the configuration assignment table in that only the memory address (Addr. A etc.) is stored in the configuration assignment table. It shall be further understood that a configuration assignment table may comprise further parameters, other parameters, and/or fewer parameters.

Further, two or more configuration assignment tables may be stored, for example, for different days of the week. Preferably, the time specification may comprise both a weekday specification and a time of day specification. Based on the weekday specification, a corresponding configuration assignment table can then first be determined, and then the configuration data set can be determined according to the time of day specification and daytime, respectively.

According to a further embodiment, the backend system may comprise at least one stamping module configured to integrate a time lapse specification into at least one message at least partially containing the configuration data set, wherein the time lapse specification may represent the validity period of the configuration data set. This can, in particular, reduce data traffic between the at least one charging station and the backend system.

Thus, when emitting (sending) a configuration data set, the backend system can send the validity period as a time lapse specification. For example, the validity period may be determined by the stamping module based on the time range specified in the configuration assignment table and assigned with the configuration data set and the instantaneous time provided by the first time module.

Preferably, the charging station may monitor the validity period of an instantaneously used configuration data set using the second timing module. Upon receipt and detection, respectively, of a trigger information in the form of an expiration of the validity period or an impending expiration (e.g., x min before the actual expiration) of the validity period, the request module may be configured to cause an emitting of a configuration request message.

Thereupon, the backend system may, as previously described, emit to the charging station a further configuration data set, which may preferably differ from the previous configuration data set in at least one parameter value.

A further aspect of the application is a method for operating a charging system, in particular, a previously described charging system. The charging system comprises at least one (previously described) backend system and at least one (previously described) charging station for charging electric vehicles. The method comprises:
determining, by a multiplex module of the backend system, a time dependent configuration data set stored in a configuration memory module of the backend system upon receipt of a configuration request message emitted by the charging station based on at least one time specification of the configuration request message,

TABLE 1

| parameter\time | permissible user group | electricity supplier | max. permissible charging current | max. permissible energy quantity per time unit | charging station operator | end customer price |
|---|---|---|---|---|---|---|
| 0:00-9:59 | Addr. A | Addr. B | Addr. C | Addr. D | Addr. E | Addr. F |
| 10:00-15:59 | Addr. G | Addr. H | Addr. I | Addr. J | Addr. K | Addr. L |
| 16:00-23:59 | Addr. M | Addr. N | Addr. O | Addr. P | Addr. Q | Addr. R | causing, by the multiplexing module, a transmitting of the determined configuration data set to the charging station; and controlling, by a charging control module of the charging station, a charging process based on the received configuration data set.

It should be noted that devices, modules, etc., according to the application may be formed of hardware components (e.g., processors, interfaces, memory means, etc.) and/or software components (e.g., code executable by a processor).

The features of the charging systems and methods can be freely combined with each other. In particular, features of the description and/or dependent claims may be independently inventive, even by completely or partially bypassing features of the independent claims, alone or freely combined with each other.

BRIEF DESCRIPTION OF THE DRAWINGS

There are now a multitude of possibilities for designing and further developing the charging system according to the application and the method for operating a charging system according to the application. In this regard, reference is made on the one hand to the patent claims subordinate to the independent patent claims, and on the other hand to the description of embodiments in connection with the drawing. The drawing shows:

In the figures, the similar reference signs are used for the similar elements.

DETAILED DESCRIPTION OF THE INVENTION

Figure 1:
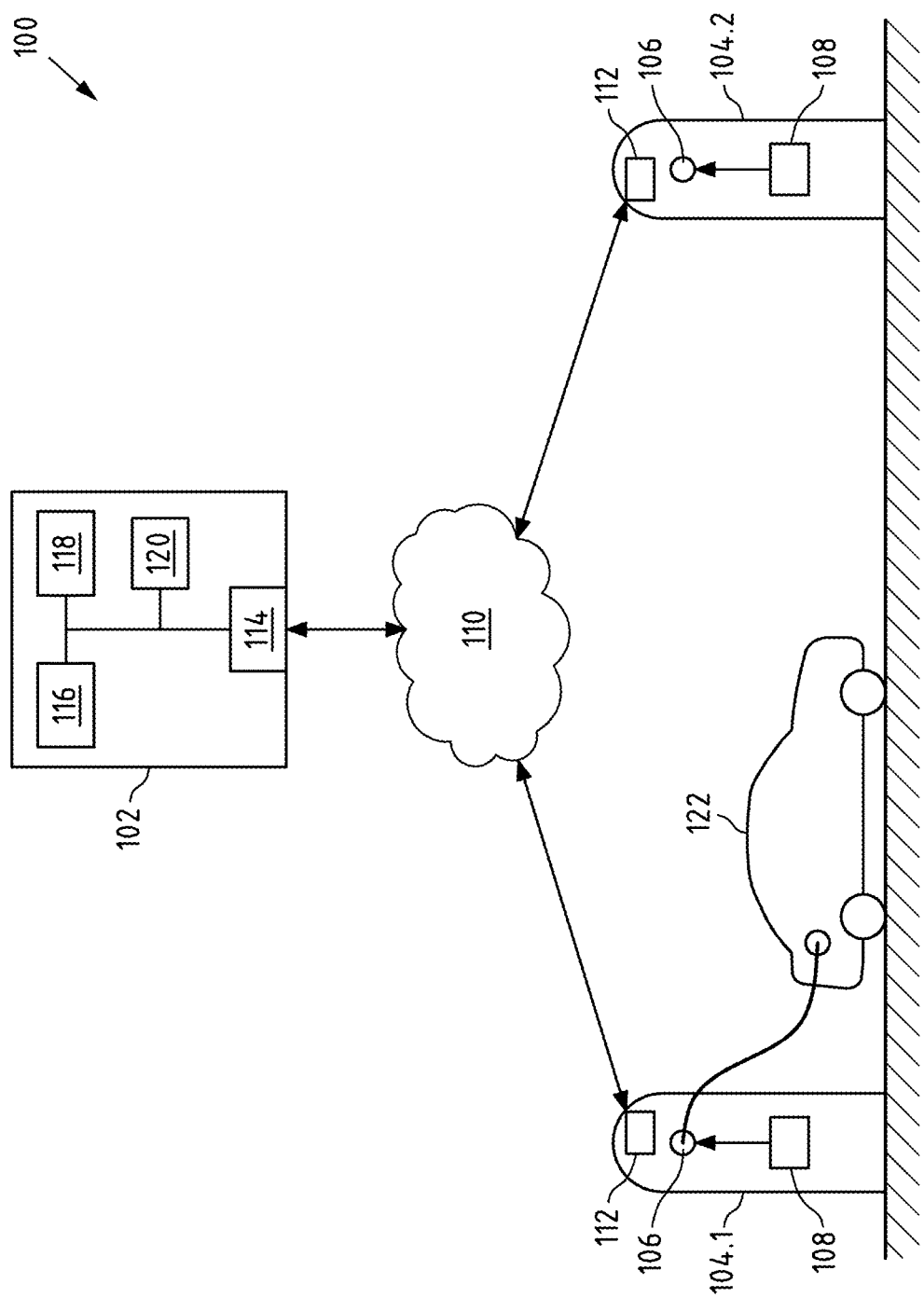
FIG. 1 a schematic view of an embodiment of a charging system according to the present application, FIG. 2 a schematic view of a further embodiment of a charging system according to the present application, and FIG. 3 a diagram of an embodiment of a method according to the present application.

FIG. 1 shows a schematic view of an embodiment of a charging system 100 according to the present application. The charging system 100 comprises at least one backend system 102, for example, at least one server 102, and at least one charging station 104. Two charging stations 104.1, 104.2 are shown herein. It shall be understood that three or more charging stations may also be provided.

Each charging station 104.1, 104.2 comprises at least one charging point 106, a charging control module 108, and at least one communication module 112, in particular, a wireless communication module 112. Each charging station 104.1, 104.2 is configured to exchange electrical power with an electric vehicle 122 during a charging process. In particular, a bidirectional power flow is possible.

A charging process is controlled here by the charging control module 108, in particular, based on an instantaneously valid configuration data set.

In the present case, the backend system 102 comprises a communication module 114, a multiplex module 116, a configuration memory module 118 and a first time module 120, in particular, in the form of a first clock 120.

Figure 3:
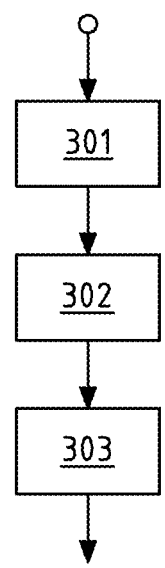

The operation of the charging system 100 is described in more detail with reference to FIG. 3. FIG. 3 shows a diagram of an embodiment of a method according to the present application. The method serves for operating a charging system 100.

In a first step 301, a time dependent configuration data set stored in the configuration memory module 118 of the backend system 102 is determined, by the multiplex module 116 of the backend system 102. In particular, the step 301 is initiated upon a receipt of a configuration request message emitted by the charging station 104, in particular, the communication module 112 of the charging station. Accordingly, the step 301 may be preceded by an emitting step in which the charging station 104 causes an emitting of a configuration request message.

The determining of the configuration data set is based on at least one time specification of the configuration request message and the time dependency of the configuration data set, in particular, a further time specification assigned with the time dependent configuration data set.

After a configuration data set is determined by the multiplex module 116, in step 302, the multiplex module 116 causes a transmitting of the determined configuration data set to the charging station 104.1, 104.2 that previously transmitted the configuration request message. In particular, the communication module 114 may transmit at least one message containing the determined configuration data set to the communication module 112 of the charging station 104.1, 104.2 via a communication network 110.

In the next step 303, a charging process, for example, a charging process between the charging point 106 of the charging station 104.1 and the connected electric vehicle 122, is controlled and carried out by the charging control module 108 of the charging station 104.1, based on the received and currently valid configuration data set.

Figure 2:
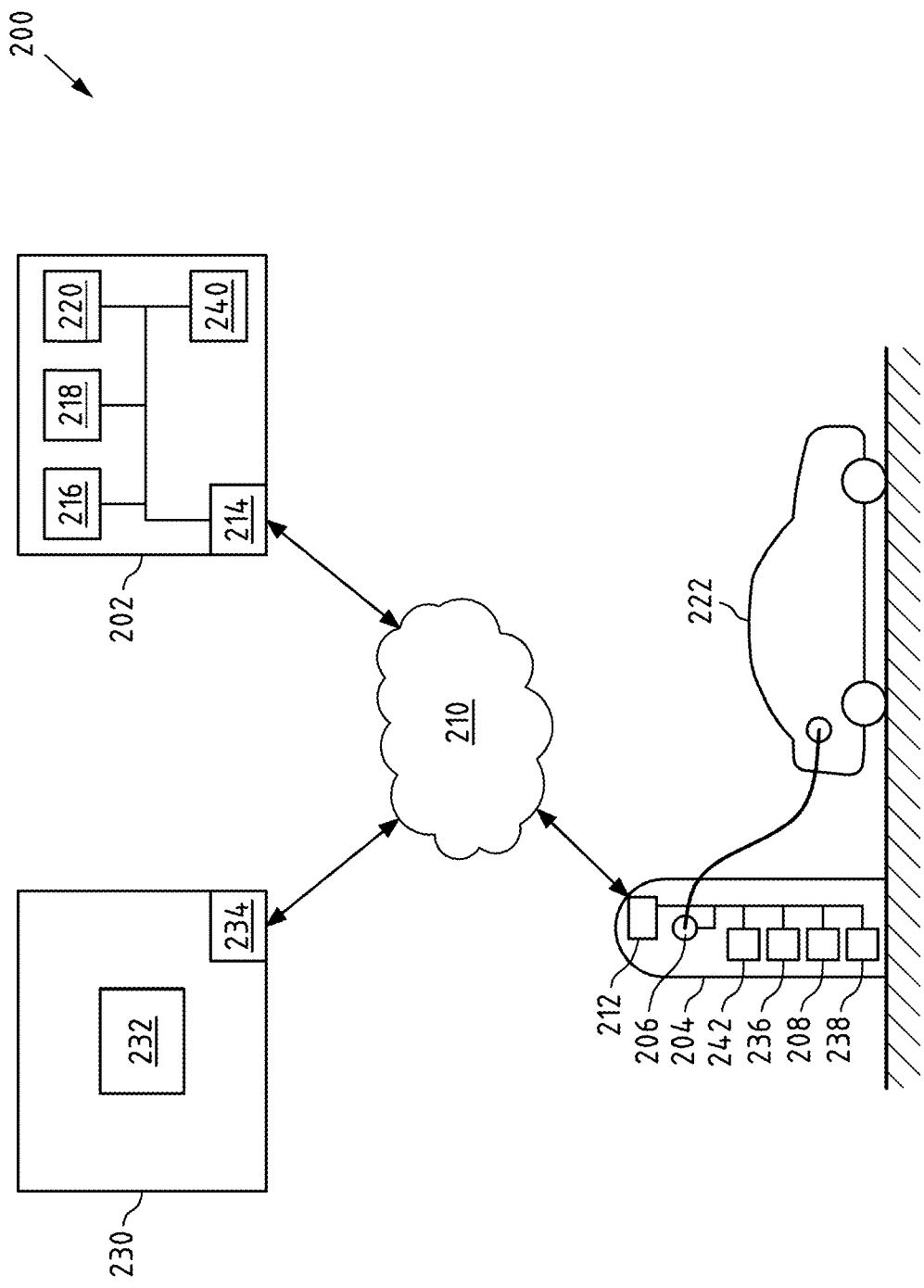

FIG. 2 shows a schematic view of a further embodiment of a charging system 200 according to the present application. To avoid repetitions, essentially only the differences from the embodiment according to FIG. 1 are explained below and otherwise reference is made to the above explanations.

In addition to at least one charging station 204 and a backend system 202, the charging system 200 in the present application comprises a master device 230. The master device 230 comprises a communication module 234 for communicating with the backend system 202 and/or the charging station 204 via the communication network 210. Furthermore, the master device 230 comprises a master time module 232, in particular, in the form of a master clock 232.

In the present embodiment, the backend system 202 comprises an optional stamping module 240.

The charging station 204 additionally comprises an optional memory module 236 for temporarily storing a configuration data set. Furthermore, a second time module 238, in particular, in the form of a second clock 238, and a request module 242 are presently integrated in the charging station 204.

The charging station 204 may be owned by an owner who may use the master device 230. A user may charge his electric vehicle 222 at the charging station 204. With the aid of the application, it is, in particular, possible that the configuration of the charging station 204 is time dependent, such as time of day dependent.

According to the present embodiment, a configuration and configuration data set, respectively, comprises, in particular, a (admissible or permissible) user group, an electricity supplier, a charging station operator, a maximum permissible (admissible) charging current, a maximum permissible (admissible) amount of energy per time unit/charging process and/or end customer prices. In particular, these parameters may be referred to as charging configuration parameters.

For example, a permissible user group may have at least one user, in particular, its unique identifier (e.g., user name, etc.), who is authorized to charge at the charging station 204 (during the temporal validity of this configuration data set). For example, an electricity supplier may provide the electrical energy required for a charging process at the charging station 204. This may also be time dependent. For example, a charging pole operator and charging station operator, respectively, is a legal entity that operates the charging station 204 for a specified period of time. The charging station operator may be different from the owner of the charging station 204.

An end customer price is, for example, a price to be paid by a user for a specific amount of energy drawn by the electric vehicle of the user during a charging process or for a specific charging duration. This can also be time dependent.

When a user and his electric vehicle 222, respectively, wants to charge at the charging station 204, the charging station 204 may preferably request the time dependent, in particular, time of day (and daytime, respectively) and instantaneously valid configuration from the backend system 202. For this purpose, the request module 242 may, for example, upon a triggering by the charging control module 208, in particular, upon a detection of a trigger information, cause a transmitting of a request in the form of at least one configuration request message to the backend system 202 via the communication network 210.

A trigger information may be, for example, a request by the user to start the charging process or a detected start of a charging process. For example, there may be a corresponding detection at a user interface or a receipt of a charging request signal from the electric vehicle 222 and/or a user terminal.

The communication module 214 of the backend system 202 may forward a received configuration request message to the multiplex module 216. The multiplex module 216 evaluates the time specification of the received configuration request message and, in particular, a configuration assignment table (e.g., Table 1 above) in order to determine the (correct) configuration data set. The determination of the configuration data set may be carried out as follows:

As exemplified above in Table 1, a configuration assignment table may have different entries with respect to the above charging configuration parameters.

In particular, Table 1 stores one-to-one addresses for various charging configuration parameters. The addresses each point to a specific memory area, for example, of the configuration memory module 218 and/or a further (not shown) data memory of the backend system 202. The addresses are preferably editable, as is the data content/parameter value stored at each of these memory addresses.

The multiplex module 216 may access an instantaneous time specification, in particular, the instantaneous time, of the first time module 220 of the backend system 202. Upon receiving a configuration request message, the multiplex module 210 may query the instantaneous time specification, in particular, the instantaneous time, provided by the first time module 220, in particular, in order to determine the (approximate) time (point) of receipt of the received configuration request message.

Depending on this time specification of the configuration request message, the multiplex module 216 may determine the assigned configuration data set by means of the time ranges indicated in the table. In particular, the multiplex module 216 may determine which of the time ranges specified in the table contains the time specification (e.g., 3:33 p.m. or 15:33) of the configuration request message by performing at least one comparison operation.

Then, the multiplex module 216 may determine the configuration parameter values by reading the memory locations uniquely determined by the respective addresses and, in particular, cause a transmission of these values, i.e., the determined configuration data set, to the requesting charging station 204. Then, the communication module 214 transmits at least one message which contains the configuration data set at least in part.

In other variants of the application, the configuration request message itself may contain a time specification that has been integrated into the configuration request message, for example, by the request module 242 when generating the configuration request message and using the second time module 238. Then, the multiplex module 216 may use this time specification alternatively (for example, when no first time module is present) or additionally to determine the valid configuration data set.

This allows for a time dependent configuration of the charging station 204.

The retrieved configuration parameter values of the configuration data set may be at least temporarily stored in the charging station 204, in particular, in the memory module 236. A previous configuration data set may be deleted or disabled and marked as invalid, respectively. Then, the charging control module 208 may control and, in particular, perform the at least one charging process according to the now valid configuration data set.

In a further embodiment, it is possible that the backend system 202 comprises a stamping module 240. The stamping module 240 may be configured to add, in particular, integrate, a time lapse specification into a message containing the configuration data set, wherein the time lapse specification represents the validity period of the configuration data set.

In other words, the time lapse specification includes, in particular, a time specification until which time point the associated configuration data set is valid and active, respectively. For example, a timer may be provided. When the timer expires, for example, the associated configuration data set is no longer valid and can be discarded, for example, marked or deleted accordingly.

With the aid of the time specification, it is advantageously possible to reduce the data traffic in the communication network 210 and, in particular, to reduce the number of configuration data sets to be transmitted per unit of time (e.g., per day). For example, a charging station 204 can act independently for a longer period of time. Advantageously, the charging station 204 comprises the second time module 238 for this purpose.

In particular, using the time specification provided by the second time module 238, such as a time of day and daytime, respectively, the compliance with the further time specification can be monitored. In one embodiment, it is provided that the second clock 238 may be configured, for example, to provide a periodic clock signal for use by the timer. Alternatively, the second clock 238 may output absolute time specification and absolute time information, respectively.

Furthermore, a master device 230 (e.g., in the form of a computing device) is provided in the present embodiment, which may be associated, in particular, with the owner of the charging station 204. The master device 230 comprises a master time module 232, in particular, in the form of a master clock 232. The master clock 232 is, in particular, designed to specify an absolute time for the further time modules 238, 220 of the charging system 200. In each case a communication link may be established via the communication network 210 in order to synchronize the second time module 236 and/or the first time module 220 with the master time module 232.

Preferably, the synchronization may be performed at specific times, in particular, at periodic intervals, such as daily, weekly, or monthly.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Charging system for electric vehicles, comprising:
at least one backend system,
at least one charging station comprising at least one charging control module configured to control a charging process between at least one charging point of the charging station and an electric vehicle connectable to the charging point at least based on a configuration data set comprising at least one charging configuration parameter,
wherein the backend system comprises at least one multiplex module connectable to a configuration memory module, wherein the configuration memory module stores a plurality of time dependent configuration data sets,
wherein the multiplex module is configured to determine a time dependent configuration data set upon receipt of a configuration request message emitted by the charging station based on at least one time specification of the configuration request message,
wherein the multiplexing module is configured to cause a transmitting of the determined configuration data set to the charging station, and
wherein the charging control module is configured to control the charging process based on the received configuration data set.

2. Charging system according to claim 1, wherein
the charging station comprises a request module configured to cause an emitting of a configuration request message upon a detection of a trigger information,
wherein the trigger information is a charging request received by the charging station from an electric vehicle to be charged.

3. Charging system according to claim 1, wherein
the backend system comprises a first time module configured to provide an instantaneous time specification, wherein the time of receipt of the configuration request message is determined as the time specification by means of the first time module.

4. Charging system according to claim 3, wherein
the charging system comprises at least one master device connectable to at least the backend system,
wherein the master device is configured to synchronize the first time module with a master time module of the master device,
wherein the master device is, in particular, configured to synchronize the first time module at predeterminable time points.

5. Charging system according to claim 1, wherein
the charging station comprises at least one second time module, and
the charging station comprises a request module configured to integrate the instantaneous time specification provided by the second time module into a configuration request message as a time specification of the configuration request message.

6. Charging system according to claim 5, wherein
the charging system comprises at least one master device connectable to at least the charging station,
wherein the master device is configured to synchronize the second time module with a master time module of the master device,
wherein the master device is, in particular, configured to synchronize the second time module at predeterminable times.

7. Charging system according to claim 1, wherein
the configuration memory module is configured to store a configuration assignment table,
wherein a specific time range, in particular, a day time range, is assigned to each configuration data set in the configuration assignment table.

8. Charging system according to claim 7, wherein
the multiplex module is configured to determine a configuration data set assigned with a specific time range by comparing the time specification with the time ranges provided in the configuration assignment table such that the configuration data set is determined which is assigned with the time range that corresponds to the time specification.

9. Charging system according to claim 1, wherein
the backend system comprises at least one stamping module configured to integrate time lapse specification into a message containing the configuration data set, wherein the time lapse specification represents the validity period of the configuration data set.

10. A method for operating a charging system, in particular, a charging system according to claim 1, comprising at least one backend system and at least one charging station for charging electric vehicles, the method comprising:
- determining, by a multiplex module of the backend system, a time dependent configuration data set stored in a configuration memory module of the backend system upon receipt of a configuration request message emitted by the charging station based on at least one time specification of the configuration request message,
- causing, by the multiplexing module, a transmitting of the determined configuration data set to the charging station; and
- controlling, by a charging control module of the charging station, a charging process based on the received configuration data set.

* * * * *